United States Patent Office 3,074,948
Patented Jan. 22, 1963

3,074,948
HETEROCYCLIC NITROGEN COMPOUNDS CONTAINING SULFONYL FLUORIDE GROUPS AND METHOD OF PRODUCING SAME
Alden G. Beaman, Tempe, Ariz.
No Drawing. Filed May 31, 1960, Ser. No. 32,566
12 Claims. (Cl. 260—254)

My invention relates to purinesulfonyl fluorides, and to methods for preparing same, which methods are also applicable to the production of other heterocyclic nitrogen compounds containing sulfonyl fluoride groups.

The principal object of my invention is the provision of new compositions of matter comprising purinesulfonyl fluorides which are active in the treatment of certain animal tumors, but which also serve as useful chemical intermediates as in the synthesis of purinesulfonamides.

Another object is the provision of an improved method for introducing sulfonyl fluoride groups into heterocyclic nitrogen systems.

The purinesulfonyl fluorides of my invention may be represented by the formula

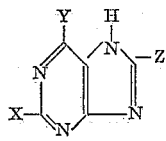

where X, Y and Z are selected from the class consisting of hydrogen, halogen, hydroxy, amino and sulfonyl fluoride radicals and in which at least one of X, Y and Z is a sulfonyl fluoride radical.

Among the interesting compounds, particularly from the standpoint of cancer research, are those having the formulas

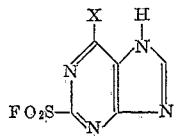

and

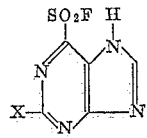

in which X is a hydrogen, chloride, hydroxy or amino radical.

These new compounds are prepared from mercaptopurines and substituted mercaptopurines prepared by known processes. In carrying out the method, the mercaptopurine is added to a compatible aqueous liquid maintained at or near zero degrees centigrade by suitable means such as a brine bath, which liquid provides an active source of fluoride ions and a buffer; and an oxidizing agent such as halogen is introduced into the mixture while it is constantly stirred until reaction has gone to completion. The compatible liquid is preferably a mixture of a relatively low molecular weight monohydric alcohol such as methanol and an aqueous solution of an acid fluoride salt or hydrofluoric acid in which a fluoride salt has been dissolved. After completion of the reaction, the purified product is found to be a purinesulfonyl fluoride in which a mercapto radical has been replaced by —SO$_2$F. This process may also be employed advantageously to produce other heterocyclic nitrogen compounds containing a sulfonyl fluoride group or groups, such as substituted pyridines, substituted pyrimidines and the like.

While various metal salts of fluoride may be used, I found that potassium fluoride, because of its greater solubility under the conditions of the reaction, is preferred as contrasted with such metal salts as calcium or sodium fluorine. Also, while other halogens can be employed as oxidizing agents, chlorine is preferred because of its demonstrated activity and stability. These illustrative examples, therefore, should not be interpreted as limiting the scope of the invention.

The starting mercapto heterocyclic compound containing nitrogen may be made by various methods disclosed in the chemical literature. Such starting materials may be represented by the formula

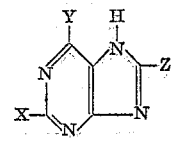

where X, Y and Z are selected from the class consisting of hydrogen, halogen, hydroxy, amino and mercapto radicals, and in which at least one of X, Y and Z is a mercapto radical.

The following examples are illustrative, both of the method and the new purinesulfonyl fluorides producible by such method.

EXAMPLE 1

Purine-6-Sulfonyl Fluoride

A mixture is first prepared

| | |
|---|---|
| Methanol | ml__ 50 |
| Aqueous hydrofluoric acid (49% HF) | ml__ 120 |
| Potassium fluoride (KF.2H$_2$O) | g__ 110 |

To the above, 20 grams of 6-mercaptopurine are added with stirring, and the flask set in a brine bath and cooled to ±3° C. Chlorine is then bubbled slowly through the mixture as stirring continues and reaction is allowed to proceed for about two hours. When the chlorine is introduced, the yellow mercapto purine color disappears, and the reaction mixture takes on a whitish pasty appearance. Completion of the reaction is indicated after about two hours by a slight drop in the temperature of the reaction mixture. During the reaction the condition of the reaction may also be checked by temporarily discontinuing flow of chlorine and using ordinary laboratory pH paper as a check. On completion of the reaction the pH paper turns white, but when the reaction is proceeding normally, the pH paper turns red and is not bleached by the mixture until the reaction has been completed.

When the reaction has gone to completion, the contents of the flask are poured over crushed ice while stirring the mixture to maintain a temperature well below 0° C. While still holding a temperature below 0° C. by introducing additional ice as required, concentrated potassium hydroxide solution is added with stirring until the mass shows a pH of 3. The product is filtered, washed with ice water and then acetone, dissolved in hot ethanol or methanol and the solution cooled to crystallize the end product out of solution. The yield is about 8 to 10 grams of purine-6-sulfonyl fluoride.

The product of the above reaction is a white crystalline solid which decomposes at about 235° C. without melting. It is soluble in acetone, ethanol and methanol. When heated in boiling water it decomposes to 6-hydroxypurine. It has a distinctive ultraviolet absorption spectrum (λ max.=284 mµ, ε=8500) in solution in alcohol.

EXAMPLE 2

6-Chloropurine-2-Sulfonyl Fluoride

Ten grams of 2,6-dimercaptopurine were added with stirring to a mixture of

| | | |
|---|---|---|
| Methanol | ml | 25 |
| Water | ml | 40 |
| $KHF_2$ | g | 60 |

The mixture was maintained at 5–10° C. for 1½ hours while constantly stirred and with $Cl_2$ continuously bubbled through the mixture. At the end of the reaction as shown by bleaching of pH paper, the entire reaction mixture was mixed with crushed ice, the pH adjusted to 3 with KOH, the precipitate washed with ice water and dried. The precipitate was then dissolved in 200 ml. of acetone at room temperature, filtered to remove insoluble material, and the acetone evaporated to dryness. The product was then recrystallized from methanol. About 5 grams of a pale yellow crystalline solid was obtained with a melting point of 202–205° C. It has a distinctive ultraviolet absorption spectrum ($\lambda$ max. 271 m$\mu$, $\epsilon$=8560) in methanol.

EXAMPLE 3

6-Hydroxypurine-2-Sulfonyl Fluoride

Ten grams of 2-mercapto-6-hydroxypurine were added to a flask containing the following:

| | | |
|---|---|---|
| Methanol | ml | 30 |
| Aqueous HF (49%) | ml | 60 |
| Potassium fluoride ($KF.H_2O$) | g | 55 |

The mixture was held within about 5° C. of zero in a brine bath, constantly stirred, and chlorine gas bubbled slowly through it. At the end of the reaction period which occurred in about one and one half hours, 10.7 grams of a reaction product were obtained by pouring the reaction mixture on excess ice, adjusting the pH to 4 by KOH addition and filtering off and drying the solid. The new product was a white powdery solid which analytical tests showed to be 6-hydroxypurine-2-sulfonyl fluoride. It showed a distinctive ultraviolet absorption spectrum in water ($\lambda$ max. 263 m$\mu$, $\epsilon$=8710 at pH 11).

EXAMPLE 4

6-Aminopurine-2-Sulfonyl Fluoride

Five grams of 2-mercapto-6-aminopurine were added to

| | | |
|---|---|---|
| Methanol | ml | 13 |
| Hydrofluororic acid (49% HF) | ml | 33 |
| $KF.2H_2O$ | g | 28 | and the mixture cooled and held at ±5° C. while stirred and with $Cl_2$ bubbling through it. Reaction time was 1¾ hours. The entire reaction mass was poured on crushed ice, the solid filtered, washed with ice water and dried. A yield of 4.5 grams of a white powdery solid was obtained. In water at pH 11 it showed a distinctive ultraviolet absorption spectrum ($\lambda$ max. 281 m$\mu$, $\epsilon$=8400).

I claim:

1. The method of producing a sulfonyl fluoride-substituted heterocyclic compound, said heterocyclic moiety selected from the group consisting of purine, pyridine and pyrimidine, which comprises mixing a mercapto derivative of said heterocyclic compound at a relatively low temperature with a mixture containing a relatively low molecular weight alcohol and a buffered aqueous solution containing a fluoride ion and continuously delivering a halogen to the reaction mixture, to oxidize the sulfur of the mercapto group and convert such mercapto group into a sulfonyl fluoride group.

2. The method of producing a purinesulfonyl fluoride which comprises mixing together a mercaptopurine, a relatively low molecular alcohol and a buffered aqueous solution containing a fluoride ion, holding the mixture at or near 0° C. and continuously introducing a halogen to the mixture until a reaction has been completed in which a sulfonyl fluoride group replaces the mercapto group of the mercaptopurine.

3. The method of producing a purine derivative of the class consisting of purinemonosulfonyl fluoride, purinedisulfonyl fluoride and purinetrisulfonyl fluoride which comprises reacting a mercaptopurine of the class consisting of monomercaptopurine, dimercaptopurine and trimercaptopurine with a fluoride radical at about 0° C. in the presence of chlorine as an oxidizing agent to convert at least one mercapto group to a sulfonyl fluoride group.

4. The method of producing a purine derivative containing at least one sulfonyl fluoride group in at least one of the positions 2, 6 and 8 on the purine ring, which comprises forming a liquid mixture containing methanol and an aqueous solution of a metal fluoride salt and hydrofluoric acid, introducing into the mixture a compound having the chemical formula

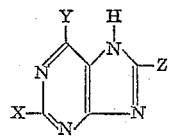

in which X, Y and Z are selected from a class consisting of H, Cl, $NH_2$ and SH radicals, at least one of which is an SH radical, cooling the mixture, and continuously introducing halogen as an oxidizing agent, and continuing the reaction until at least one SH radical is converted to $-SO_2F$.

5. The method of producing a purine derivative containing at least one sulfonyl fluoride group in at least one of the positions 2, 6 and 8 on the purine ring, which comprises forming a liquid mixture containing methanol and an aqueous solution of $KHF_2$, introducing into the mixture a compound having the chemical formula

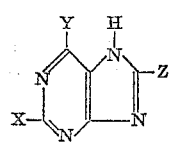

in which X, Y and Z are selected from a class consisting of H, Cl, $NH_2$ and SH radicals, at least one of which is an SH radical, cooling the mixture, and continuously introducing halogen as an oxidizing agent, and continuing the reaction until at least one SH radical is converted to $-SO_2F$.

6. A chemical compound having the formula

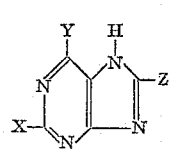

in which X, Y and Z are selected from a class consisting of H, Cl, OH, $NH_2$ and $SO_2F$ radicals, and in which at least one of such X, Y and Z is an $SO_2F$ radical.

7. A chemical compound having the formula

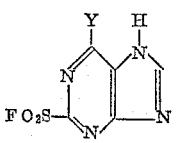

in which Y is selected from the class consisting of a hydrogen chloride, hydroxy and amino radical.

8. A chemical compound having the formula

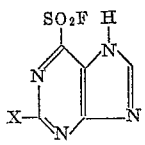

in which X is selected from the class consisting of a hydrogen, chloride, hydroxy and amino radical.

9. Purine-6-sulfonyl fluoride.

10. 6-chloropurine-2-sulfonyl fluoride.
11. 6-aminopurine-2-sulfonyl fluoride.
12. 6-hydroxypurine-2-sulfonyl fluoride.

References Cited in the file of this patent

Giner-Sorolla: Jour. Amer. Chem. Soc., vol. 80, pages 3932–3937 (1958).

Giner-Sorolla: Jour. Amer. Chem. Soc., vol. 80, pages 5744–5748 (1958).